US008826406B2

(12) United States Patent
Ahn et al.

(10) Patent No.: US 8,826,406 B2
(45) Date of Patent: Sep. 2, 2014

(54) PASSWORD SECURITY INPUT SYSTEM USING SHIFT VALUE OF PASSWORD KEY AND PASSWORD SECURITY INPUT METHOD THEREOF

(76) Inventors: Kyu Choul Ahn, Seoul (KR); Yoon Ha Ahn, Anyang-si (KR)

( * ) Notice: Subject to any disclaimer, the term of this patent is extended or adjusted under 35 U.S.C. 154(b) by 0 days.

(21) Appl. No.: 13/695,014

(22) PCT Filed: Jan. 31, 2011

(86) PCT No.: PCT/KR2011/000677
§ 371 (c)(1),
(2), (4) Date: Oct. 26, 2012

(87) PCT Pub. No.: WO2011/136464
PCT Pub. Date: Nov. 3, 2011

(65) Prior Publication Data
US 2013/0047237 A1 Feb. 21, 2013

(30) Foreign Application Priority Data

Apr. 26, 2010 (KR) .................. 10-2010-0038326
Jan. 31, 2011 (KR) .................. 10-2011-0009541

(51) Int. Cl.
*G06F 7/04* (2006.01)

(52) U.S. Cl.
USPC .............................................. 726/7; 713/182

(58) Field of Classification Search
USPC .................. 713/182–184; 726/7, 19
See application file for complete search history.

(56) References Cited

U.S. PATENT DOCUMENTS

| | | | |
|---|---|---|---|
| 6,269,164 B1 * | 7/2001 | Pires | 380/42 |
| 7,441,181 B2 * | 10/2008 | Yamada et al. | 715/226 |
| 2002/0076044 A1 | 6/2002 | Pires | 380/37 |
| 2010/0287382 A1 * | 11/2010 | Gyorffy et al. | 713/185 |
| 2011/0145587 A1 * | 6/2011 | Park | 713/182 |
| 2012/0110663 A1 * | 5/2012 | Kim et al. | 726/19 |

FOREIGN PATENT DOCUMENTS

| | | |
|---|---|---|
| JP | 2002-287871 | 10/2002 |
| JP | 2003-091506 | 3/2003 |
| JP | 2006-107411 | 4/2006 |
| KR | 10-2002-0074475 | 9/2002 |
| KR | 10-2004-0056273 | 6/2004 |
| KR | 10-2004-0091494 | 10/2004 |
| KR | 10-2008-0011363 | 2/2008 |

OTHER PUBLICATIONS

International Search Report for PCT/KR2011/000677 mailed Sep. 23, 2011.

* cited by examiner

*Primary Examiner* — Samson Lemma
(74) *Attorney, Agent, or Firm* — AKC Patents LLC; Aliki K. Collins

(57) ABSTRACT

The present invention relates to a password security input system which performs authentication through input of a security password key which is obtained by applying a shift value to an actual password key, and a password security input method thereof. According to the present invention, a password security input system is configured with a user terminal comprising: a password setting module for receiving and storing an actual password which is inputted during the initial setting by a user; an input window generating module for generating an input window in which key buttons are randomly disposed in every instance where a password is inputted; a password input module for receiving keys of a security password which are position-changed by applying the same shift distance to the key positions of the actual password in the input window displayed on a screen; and a password authentication module for comparing a key shift value of the pre-stored actual password with a key shift value of a security password inputted by a user on the basis of the input window, and determining that password authentication is in success when the two key shift values are the same. According to the present invention, even if a security password is exposed to a third person, the user can maintain the actual password with a sound mind.

15 Claims, 6 Drawing Sheets

<initial arrangement>   <random arrangement>

<in case that genuine password is "*123" in random arrangement>

<"8265" is pressed when user adapts key shift value <1,1> with respect to genuine password "*123">

PASSWORD SECURITY INPUT SYSTEM USING SHIFT VALUE OF PASSWORD KEY AND PASSWORD SECURITY INPUT METHOD THEREOF

RELATED APPLICATIONS

This application is a 371 application of International Application No. PCT/KR2011/000677, filed Jan. 31, 2011, which in turn claims priority from Korean Patent Application Nos. 10-2011-0009541, filed Jan. 31, 2011, and 10-2010-0038326, filed Apr. 26, 2010, each of which is incorporated herein by reference in its entirety.

TECHNICAL FIELD

The present invention relates to a password security input system and a password security input method, and in particular to a password security input system and a password security input method by which a users password can be used in safe by performing a password authentication with a shift value of a password key by receiving a security password from a user.

BACKGROUND ART

This application claims priority to Korean patent applications number 10-2010-0038326 filed on Apr. 26, 2010 and Korean patent application number 10-2011-0009541 filed on January 31 by the same application as the present application, which are incorporated herein by reference in their entirety.

As a universal method for a user authentication, a password authentication method is widely used. In the password authentication method, a password inputted from a user at the time of an initial setting procedure is stored, and a security password inputted from a user, if necessary, is compared with a previously stored password. When matched, the authentication of the password is succeeded.

Here, the password might be exposed to other in various ways. For example, a third party might be watch a users password being inputted, thus knowing the password. A certain hacking program might be programmed to hack the password key-inputted on a user's terminal, thus knowing the password. The hacking program might intercept a password from the data in a network communication, thus knowing the password.

As explained above, the password input method is configured to ask the user to input the same password that the user initially has set, so if a third party finds out the password, the third party can use the password limitlessly. Even when the password inputted from the user is encoded for reinforcing the security, the third party might hack the encoding method adapted to the password, thus unlocking the password. So, it is urgently needed to develop a new password authentication method which makes sure that the third party cannot use the password even when the user's password is exposed to the third part.

DISCLOSURE OF INVENTION

Accordingly, the present invention is made to improve the above explained problems. It is an object of the present invention to provide a password security input system and a password security input method which make sure that the password can be protected even when the security password is exposed to a third party in such a way that key arrangement are made different for each password input instance, and a security password the arranged position of which has changed from the actual password is received.

To achieve the above objects, there is provided a password security input system using a shift value of a password key, comprising a password setting module configured to receive a genuine password from a user based on an initial setting; an input window generation module configured to generate an input window on which are randomly arranged a plurality of key buttons for each instance of an input of a password; a password input module configured to receive a key of a security password the position of which has changed by adapting the same shaft distance at the position of the key of the genuine password on the input window displayed on a screen; and a password authentication module configured to compare the key shift value of the previously stored genuine password on the input window and the key shift value of the security password inputted from the user and, if matched, to judge it as the password authentication is succeeded.

In addition, the password security input system using a shift value of a password key comprises a password setting module configured to receive a genuine password from a user terminal based on an initial setting; an input window generation module configured to generate an input window on which are randomly arranged a plurality of key buttons for each instance of an input of a password and to transmit to the user terminal; a password input module configured to receive a key of a position-changed security password by adapting the same shift distance to the key position of the genuine password of the input window from the user terminal after the input window is displayed on the user terminal; and a password authentication module configured to compare the key shift value of the previously stored genuine password on the input window and the key shift value of the security password inputted from the user and, if matched, to judge it as the password authentication is succeeded.

In the present invention, the input window comprises a key button containing at least one among a number key, a character key and an image key.

According to an aspect of the present invention, the key shift value is a shift coordinate value (x2-x1,y2-y1) with respect to a first key button (x1, y1) and a second key button (x2, y2) consecutively inputted from the password with respect to the key buttons arranged in the axes X and Y.

Here, when the password is n (n>1), the (n-1) number of the key shift values obtained from two consecutively inputted keys is generated.

Alternatively, the input window generation module generates a n-number of the input windows on which are randomly arranged a plurality of key buttons for each digit input when the password is n(n>1), and converts to a certain input window whenever a security password of a n-digit is inputted from the user terminal.

Here, the password input module is configured to further receive a certain key irrespective of the shift value of the key coordinate of the genuine password.

In addition, the password authentication module performs the authentication of the security password whenever the security password key of an individual digit is inputted from the user and guides for the security password to be inputted from the beginning when the authentication of the security password is failed.

Moreover, there is further provided a user terminal configured to receive an input window from an authentication server and displays it on the screen, and to transmit the security password received from the user to the authentication server for requesting an authentication.

To achieve the above objects, there is provided a password security input method using a shift value of a password key characterized in that it performs an authentication as a user terminal receives a security password, not a genuine password under a stand-alone environment, comprising a step (a) for receiving a genuine password from a user based on an initial setting and storing into an internal memory; a step (b) for generating an input window on which are randomly arranged a plurality of key buttons for each instance of an input of a password; a step (c) for receiving a key of a position-changed security password by adapting the same shift distance to the key position of the genuine password on the input window after the generated input window is displayed on the screen; and a step (d) for comparing the key shift value of the previously stored genuine password with the key shift value of the security password inputted from the user and if matched, judging that the password authentication is succeeded.

Advantageous Effects

According to one aspect of the present invention, the user is provided an input window on which the positions of key buttons change for each authentication, and the user inputs a disposal type security number, so the user can input the security password in safe even when the security password is exposed to a third party.

BRIEF DESCRIPTION OF DRAWINGS

The accompanying drawings in the present invention is provided for illustrative purposes and better understanding of the technical concepts of the invention along with the following descriptions of the invention, and the present invention is not limited to the disclosures of the drawings.

BEST MODES FOR CARRYING OUT THE INVENTION

Figure 1:
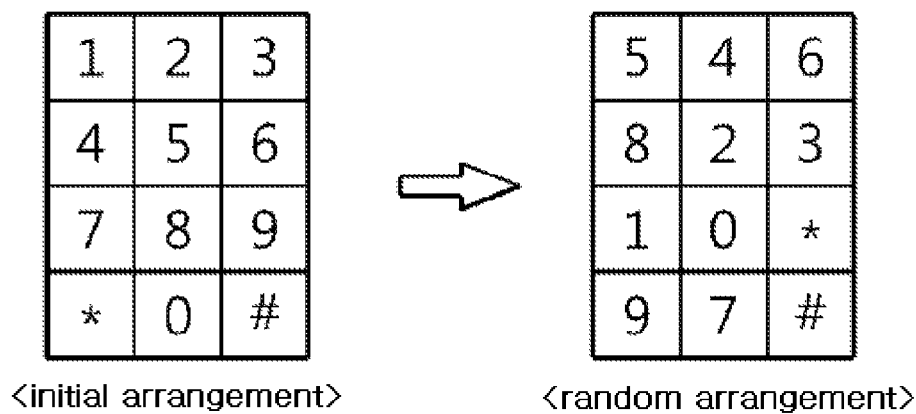
FIGS. 1 to 3 are views illustrating the password using the shift values of the keys according to an embodiment of the present invention.
Figure 1:
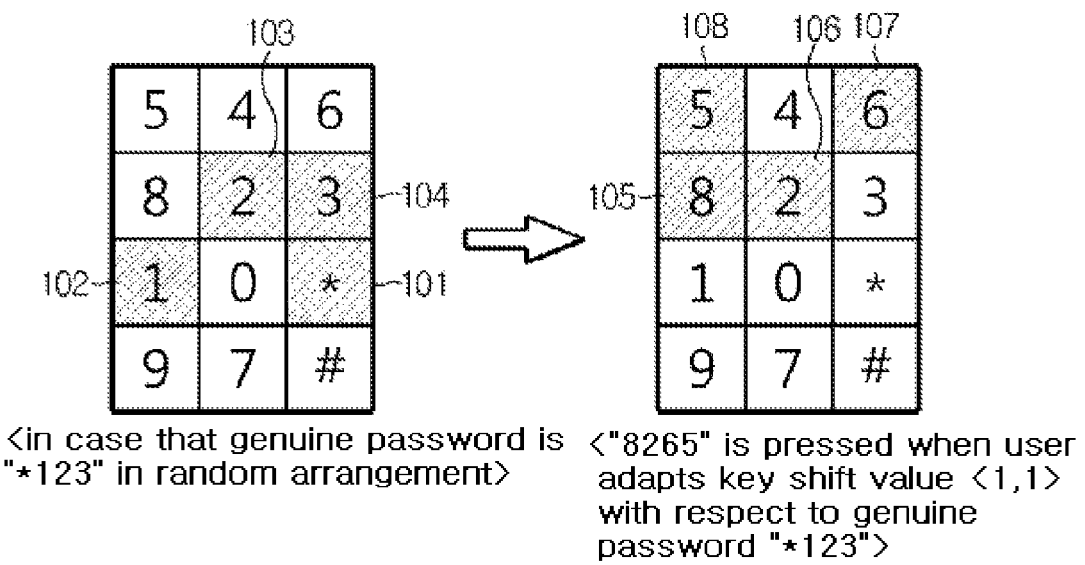

The preferred embodiments of the present invention will be described in details with reference to the accompanying drawings. The terms and words used in the specification and claims should not interpreted on known and dictionary basis, but should be interpreted based on the principles that such terms and words are provided for the purpose of best describing the inventions of the inventors.

Therefore, the embodiments of the specification and constructions shown in the drawings mean an embodiment of the most preferred embodiments, not presenting all the technical concepts of the present invention, and it should be understood that there might be various equivalents and modifications.

<1. Technical Model>

FIG. 1 is a view illustrating a password input screen according to an embodiment of the present invention.

For the sake of simplification, it is assumed that there are 12 key buttons each sized 3*4. The key buttons are arranged on the conventional input window 10 depending on a sequence of numbers. However the input window 11 according to an embodiment of the present invention is characterized in that the key buttons are randomly mixed for each instance of the password input.

Here, when the genuine password of a user is formed of four digits "*123", the user pushes in sequence the key button 101 of "*", the key button 102 of "1", the key button 103 of "2" and the key button 104 of "3". As mentioned before, the operation that the user inputs genuine passwords for requesting authentication is needed because the password might be cheated by a third party.

In the embodiment of the present invention, the user does not input the genuine password, but pushes the key buttons of the passwords (security passwords) arranged at the same distance from the key buttons of the genuine passwords. In other words, in the embodiment of the present invention, the user does not input the genuine password "123", but pushes the security password "8265" by adapting the key shift distance <1,1> assigned at the key button positions of the genuine password. The input of the security password "8265" can be finished as the user pushes the key button 105 of "8", the key button 106 of "2", the key button 107 of "6" and the key button 108 of "5".

Here, the key shift distance <1,1> means one space shift to the rightward side on the axis X and one space shift to the upward side on the axis Y. For example, in case of the key button of the number "6", the one space shift to the rightward side on the axis X <1,0> means the key button of "5" based on the rolling method, and the one space shift to the upward on the axis Y <0.1> means the key button of "#" based on the rolling method. When the key shift distance <1,1> is adapted to the key button of "6", it moves to the key button of "9".

According to an embodiment of the present invention, the user can have authentication as he inputs the security password "8265", not the genuine password. The above mentioned security password is provided only for the sake of the password authentication on the input window 11 of the corresponding instance. Even through a third party steals the security password "8265", the arrangements of the following password input window are randomly mixed. Since the first inputted password is not the genuine password, the authentication using the hacked password will be failed.

Figure 2:
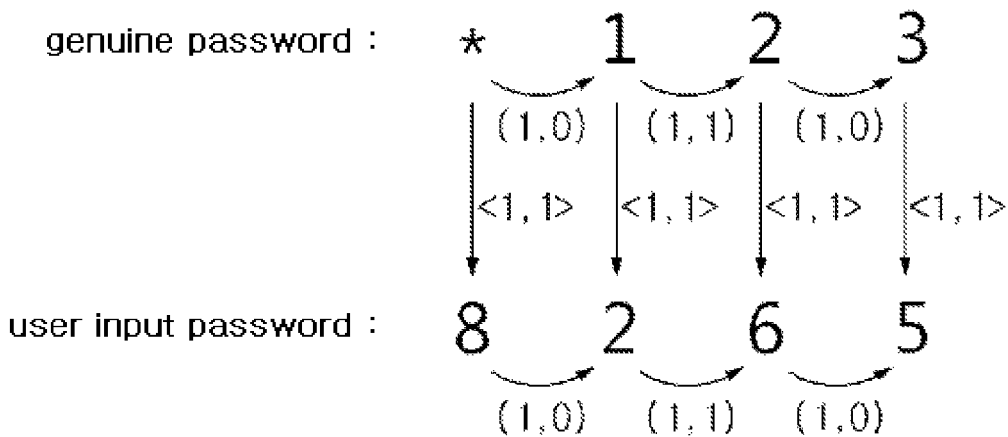

FIG. 2 is a view illustrating a shift value of the key button in an example of the password input of FIG. 1.

The genuine password of the user is formed of four digits "123", and the shift value between the consecutively inputted first key button and the second key button appears to be (1,0) between "*" and "1" and (1,1) between "1" and "2" and (1,0) between "2" and "3". In other words, there exist a (n-1) number of shift values between two consecutive key buttons in the n-digit number of passwords.

According to the embodiment of the present invention, the security password "8265" is inputted by adapting the shift distance <1,1> when a user wants to protect the genuine password. The shift coordinate value between two consecutive key buttons (1,0) between "8" and "2" and (1,1) between "2" and "6" and (1,0) between "6" and "5", respectively. The genuine password and the password (security password) inputted by the user feature that the shift coordinate values between two consecutive key buttons are (1,0), (1,1), (1,0) which are same.

According to an embodiment of the present invention, when a user authenticate, on the randomly arranged input window 11, the shift coordinate value between two consecutive key buttons of the genuine password is compared with the shift coordinate value between two consecutive key buttons of the security password. If the values are matched, the authentication is succeeded, and if the values are not matched, the authentication is not succeeded.

Figure 3:
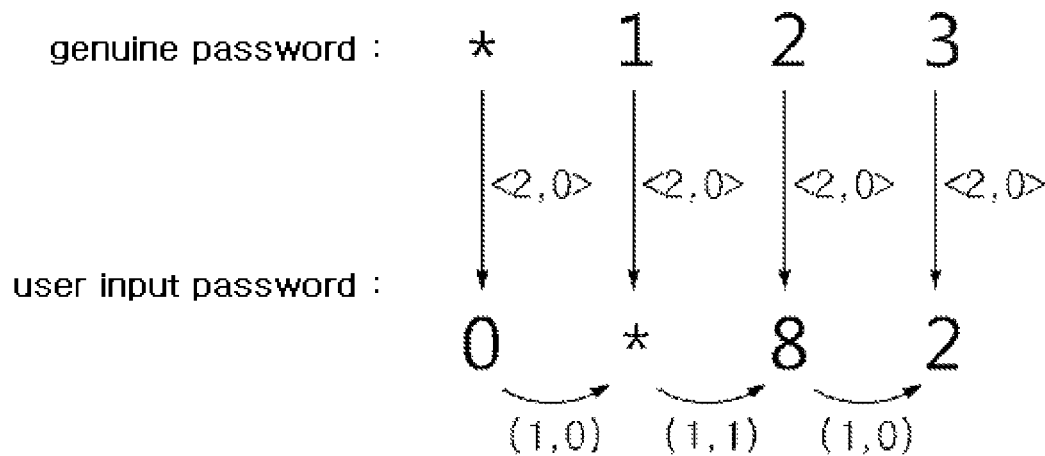

FIG. 3 is a view illustrating another security password that the user can alternatively input in FIGS. 1 and 2.

As shown in FIGS. 1 and 2, the genuine password of the user is "*123". Here, the user can randomly adapt the shift values. If the user adapts the shift distance <2,0> to the genuine password, the users security password becomes "0*82". If the security password is "0*82", the shift values (1,0), (1,1) and (1,0) are maintained between two consecutive key buttons, so the security password "0*82" can have three shift values same as the genuine password.

The user can randomly adapt the shift distance <a,b> for the purpose of protecting the genuine password. So, the user can select a certain key button among 11 key buttons except for the genuine password "*" when inputting the first digit of the password. In other words, when the user decides the first digit of the password, the corresponding shift value is identically adapted to the following digit of the password. For example, if the user inputs "5" instead of the first digit "*" of the genuine password, the shift distance <1,2> is determined. When adapting the shift distance <1,2> to the genuine password, the user inputs "5" and then inputs "4#9" as the security password, so the authentication of the password can be succeeded.

FIGS. 1 to 3 are provided for the illustrative purposes to help understand the present invention, not limiting the scope of the present invention. According to the embodiments of the present invention, the user is assigned the input window of the randomly mixed key buttons for each instance when the user inputs the password. The user inputs the security password to which is adapted a certain shift distance <a,b> from the positions of the key buttons of the genuine password of the corresponding input window, so the genuine can be protected from hacking.

<2. System Construction>

Figure 4:
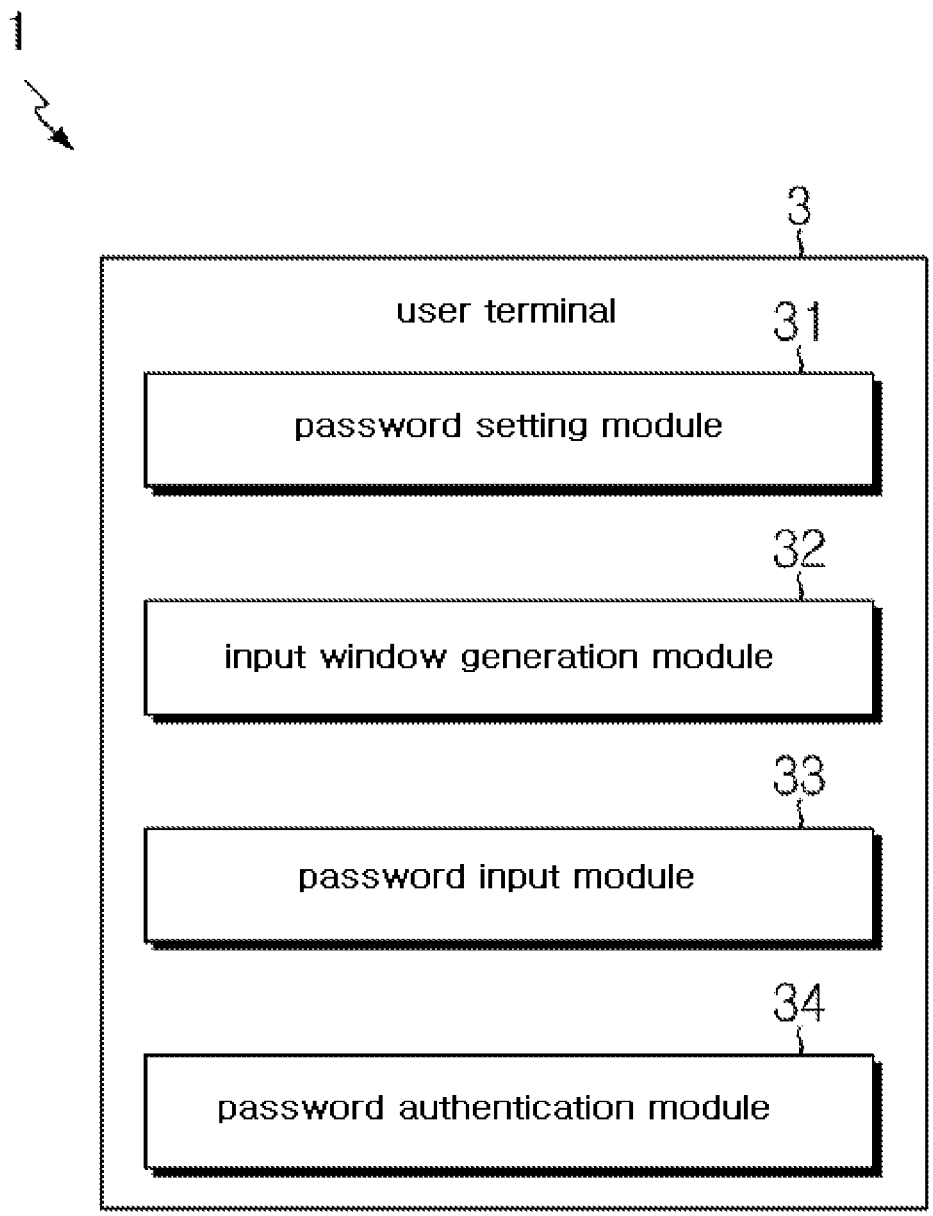
FIG. 4 is a schematic view illustrating the construction of a password security input system under a stand-alone environment according to an embodiment of the present invention.

FIG. 4 is a schematic view illustrating the construction of the passwords security system 1 under the stand-alone environment according to an embodiment of the present invention.

The term "stand-alone" means that a user can perform an input of the password and an authentication of it without a communication with the other devices. The user's devices configured with the stand-alone environment are a wired or wireless information communication terminal such as a personal computer terminal (for example, desk top computer, laptop computer, etc), a mobile communication terminal and other cellular phones, an ATM device, a door lock, a smart television, etc. The user device 3 is a certain device such as an electric, electronic device as long as it is equipped with a processor and a memory, the kinds of which are not limited thereto.

The password input method of the stand alone environment will be described. It can be used when the user password authentication is succeeded on the mobile communication terminal or the user password authentication is succeeded on the television. In other words, the user device 3 is configured to receive the password and perform an authentication in a singular form.

The user device 3 according to an embodiment of the present invention comprises a password setting module 31 for initially setting the genuine password from a user, an input window generation module 32 generating an input window so that key buttons are randomly generated for each input instance of the password, a password input module 33 receiving a security password from the user by way of the input window displayed on the screen, and a password authentication module 34 authenticating the security password inputted by the user.

The password setting module 31 is configured to set the genuine password by the user and stores it in the internal memory of the user device 3. The password might be encoded and stored.

It is preferred that the password setting module 31 sets the password consisting of a plurality of keys by a user.

The input window generation module 32 generates an input window on which are randomly arranged the key buttons for each input instance depending upon the size and shape of the defined input window and the key buttons and displays it on the screen.

The input window generation module 32 might generate an input window on which are arranged key buttons randomly combined of characters, numbers, images, special keys, emoticon, etc. So, the input window can have the sizes and shapes which are different from them of the input window of FIGS. 1 to 3.

The input window generation module 32 might generate an input window which changes upon every input of the key button depending on the password input policy and might display on the screen. For example, when the password is formed eight digits, different input windows can be provided eight times for the purpose of receiving the key buttons of the security password of each digit. The first and second digits are received in the form of English alphabet keys, and the remaining 6-digit password can be inputted using the numeral keys. When the security password is inputted on eight input windows, eight independent password authentications should be performed using the key buttons arranged on eight input windows for the sake of the password authentication.

The password input module 33 selects the key buttons of the security password from a user by way of the input window displayed on the screen. The password input module 33 selects them by way of the screen touch method or the arrow buttons displayed on the key pad.

Alternatively, the password input module 33 might further receive a certain key (non-matching key) which is not related to the shift value of the key coordinate of the genuine password. For example, as shown in FIGS. 1 to 3, the digits of the password are fixed at 4; however if a certain key insertion method is adapted, more than 5 digits including a certain key can be inputted as the password from the user. The certain key means a key mismatched on purpose by the user so as to protect the genuine password. As shown in FIG. 2, the user inputs "8?265", "82???65" or "?8265" instead of inputting the password "8265". Here, "?" means a certain key which can be positioned at any position in the digits of the security password. When a certain key is inputted and a third party knows "8?265", the third party might think that the password is formed of 5 digits. In addition, the third party might think that the length of the password changes every time and might be confused, so the security of the password is more reinforced. When a certain key insertion method is adapted, even when a certain digit is failed for the authentication in the course of the password authentication, it is not judged as the authentication has failed, and the authentication is performed for the following digit. When the key buttons are matched four times in sequence in terms of the lengths of the whole security passwords, it is judged as the authentication has succeeded.

The password authentication module 34 is configured to compute the shift values between two consecutive key buttons and to judge whether the genuine password and the security password of the user match or don't match with respect to the key button arrangements of the current input window.

If the password is n (n>1), the (n-1) number of key shift values obtained from two consecutive inputted keys generates. FIGS. 1 to 3 shows three shift values (1,0), (1,1), (1,0) with respect to the password consisting of four digits.

The password authentication module 34 might have various authentication methods depending on the authentication policy. For example, as shown in FIGS. 1 to 3, the 4-digit password is inputted on one input window, and all the four digits are concurrently authenticated. As another example, as shown in FIGS. 1 to 3, whenever one-digit security password is inputted, the authentication is performed, and if it is authenticated, the following digit is authenticated. For example, when a user inputs a first digit of "8", the password authentication module 34 judges it as the success of the authentication, and receives the security password of the second digit. If the user inputs "3", not "2", the authentication of the security password is failed, and it is guided for the user to input the security password from the first digit again. The authentication of the password can be succeeded if the input of the user's security password is valid for the 4 consecutive times. If not matched in the course of the authentication, the user is guided to input the four-digit security password from the beginning. If the different input window is provided for each digit belonging to the security password, the password authentication module 34 is configured to provide the following input window only when the authentication for each digit is succeeded. In the random key insertion method, if the shift values of the remaining keys except for a certain key non-matching with all the digits of the security password and the genuine password key are matched with each other, it is judged as the authentication has been succeeded.

Figure 5:
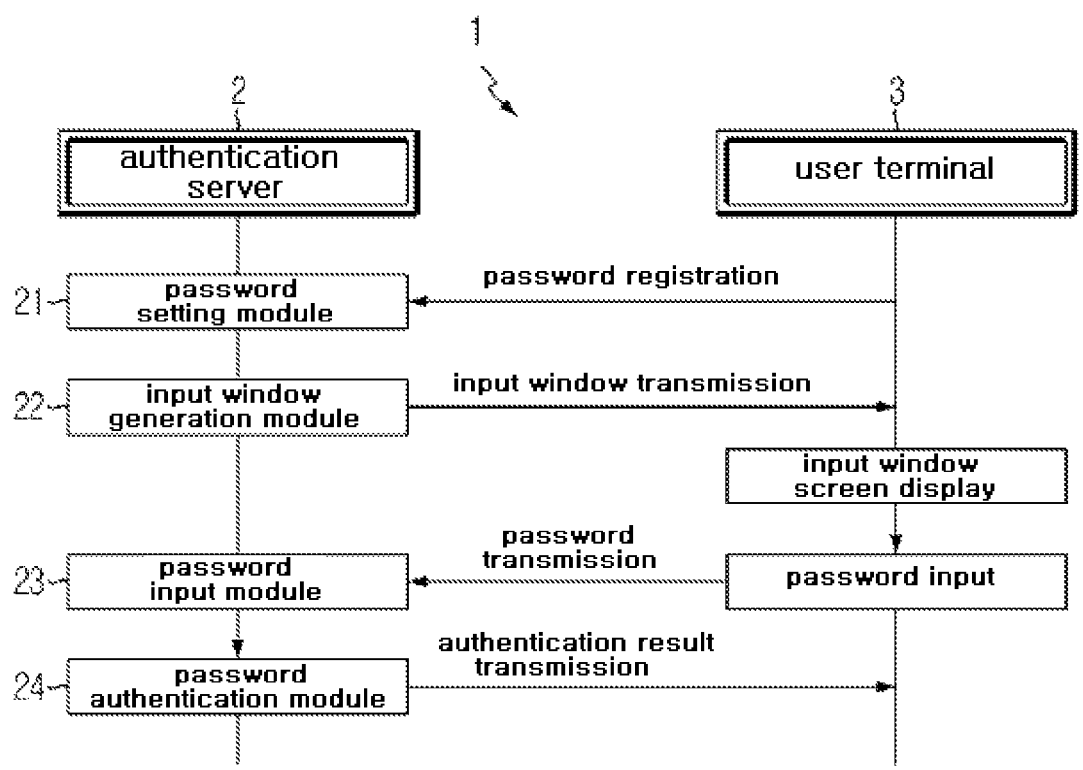
FIG. 5 is a schematic view illustrating the construction of a password security input system under a network environment according to another embodiment of the present invention.

FIG. 5 is a schematic view of the password security input system 1 under the network environment according to another embodiment of the present invention.

Here, the term "network environment" means that the authentication server 3 receives a security password from the user device 3 by way of the wired or wireless network and performs the authentication and then responses to the user device 3. The wired or wireless network might be all kinds of the communication network on which is possible a data communication using various protocols like a wired or wireless public network such as a mobile communication network and an internet or a dedicated network.

The password input method of a network environment features in that a user inputs an ID and a password so as to make a login on the server (for example, homepage). For example, it is like the user accesses the internet banking server and then inputs various passwords such as a login password or an OTP number. In this case, when the password input method of the present invention is actually applied, the user device 3 requests an authentication by sending the security password inputted by the user to the authentication server 2 and receives a result of the authentication from the authentication server 2.

The password input system 1 according to another embodiment of the present invention comprises an authentication server 2 connected with a wired or wireless network and a user device 3.

Here, the construction modules 31~34 of the user device of the stand alone types server to perform the same functions in the authentication server 2 of FIG. 5. In details, as shown in FIG. 5, the password setting module 21, the input window generation module 22, the password input module 23 and the password authentication module 24 of the authentication server 2 perform the same functions as the corresponding construction module of FIG. 4. So, only the differences changing depending on the client and server environments will be described hereinafter.

The password setting module 21 is configured to receive the genuine password from the user device 3 set by the user and to store in the internal database.

The input window generation module 21 generates an input window on which are mixed and arranged the key buttons differently depending on every input instance in accordance with the size, shape and key buttons of the defined input window and transmits to the user device 3. The user device 3 displays the received input window on the screen, and receives the security password from the user.

The password input module 23 receives a security password received upon the selection of the key button of the user by way of the input window displayed on the screen of the user device 3. The received security password might contains a certain key based on the application of a random key insertion method, The password authentication module 24 judges whether the genuine password and the security password of the user match with respect to the key button arrangements of the input window transmitted to the user device by calculating the shift values between two consecutive key buttons and transmits a result of the password authentication to the user device 3.

<3. Method Construction>

The password security input method using a shift value of a password key according to an embodiment of the present invention can be implemented by way of the construction of the password security system 1.

Figure 6:
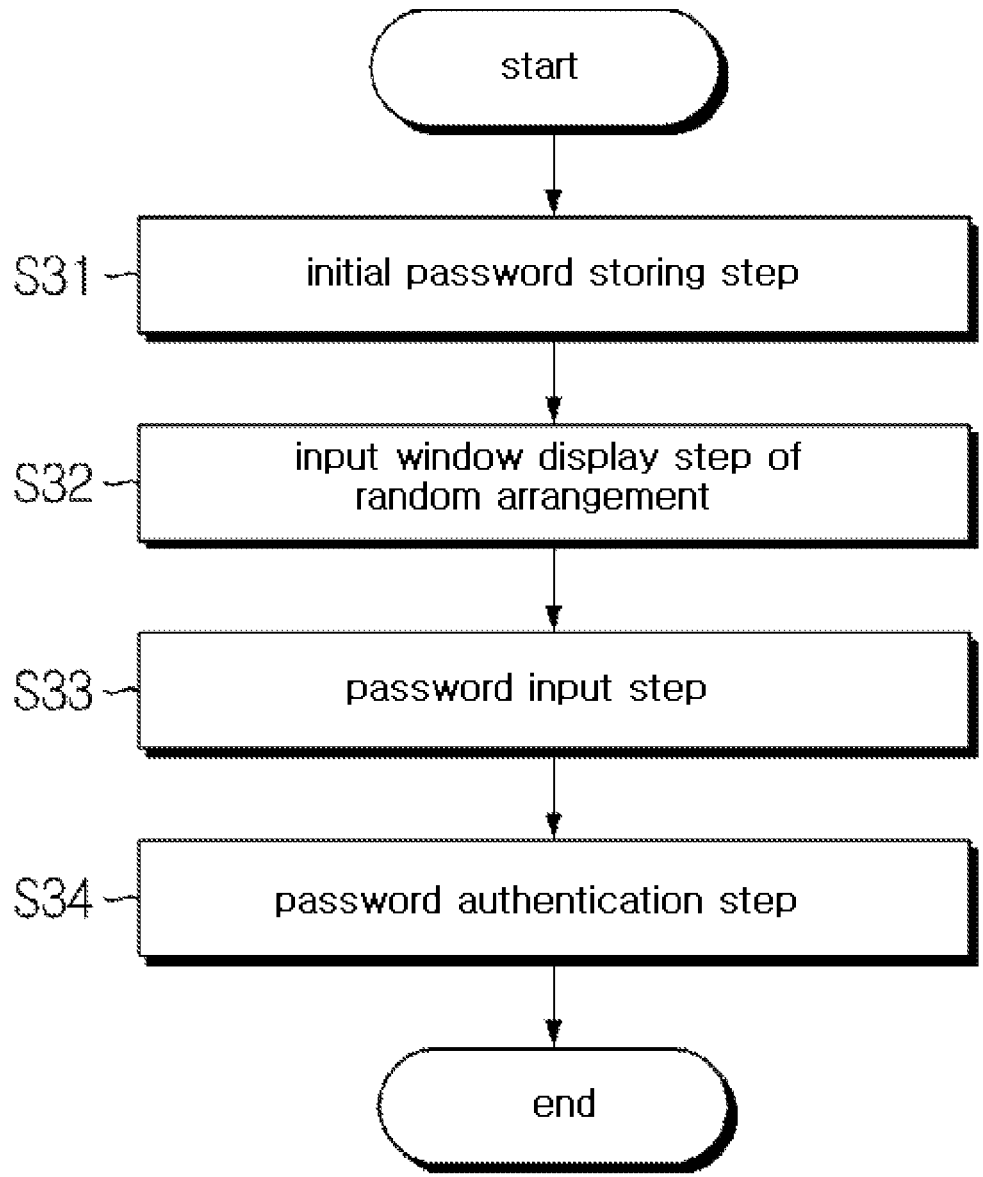
FIG. 6 is a schematic flow chart of a password security input method under a stand-alone environment according to an embodiment of the present invention.

FIG. 6 is a schematic flow chart of a password security input method of a stand-alone environment according to an embodiment of the present invention.

The password setting module 31 of the user device 3 receives a genuine password from the user based on an initial setting and stores (S31). The thusly stored genuine password is referred in the course of the authentication. The password is formed of numbers, characters, images, emoticons, etc. Each password has a relative coordinate with respect to each other. When the password formed of n-digits is set, the (n-1) number of the shift coordinate value between the neighboring passwords is generated based on the coordinate value of each password. In addition, the coordinate includes a 2D coordinate formed of the axes X and Y as well as a 3D coordinate formed of axes X, Y and Z. In particular, it is preferred that it is arranged in the matrix form as shown in FIG. 1, and it might be formed in a spherical shape or other shapes.

The input window generation module 32 of the user device generates an input window formed of the key buttons randomly arranged for each password input instance of one time and displays on the screen of the user device 3 (S32). The map configuration (or matrix) (in other words, arrangement of password) with respect to the thusly generated input window is temporarily stored in the internal memory. Different input windows might be generated for each digit belonging to the password and might be displayed. If the password is formed of n-digits, different input window are provided n-times, thus receiving a n-digit of the password. The password input module 33 receives a password from a user by way of the input window displayed on the screen (S33).

The password input module 33 receives a security password to which is adapted a key shift distance <a, b> instead of receiving a genuine password from the user. So, even when the third party hacks the security password of the user, the user can be safe because the genuine password is not hacked. The security password to which is adapted the key shift value of the present invention is a disposal type password which can be authenticated only on the input window, the third party can't succeed the authentication even when the hacked security password is inputted multiple times.

In addition, the password input module 33 is a selective construction for reinforcing the security and features in that a random key inputted on purpose from the user can be received into the intermediate portion of the password input characters (random key insertion method).

When a security password is received, the password authentication module 34 compares whether to determine whether or not two shift values match with respect to the genuine password and the security password based on the map configuration of the stored password input window, and if matched, it is judged as the success of the authentication (S34).

First of all, the password authentication module 34 obtains the shift coordinates x2-x1, y2-y1 with respect to consecutive first key button (x1, y1) and a second key button (x2, y2) of the previously stored genuine password of the step (a) on the input window of the step (b). If the password is n(n>1), a (n-1) number of the key shift values is calculated using two consecutively inputted keys.

When the (n-1) number of the key shift values with respect to the genuine password is obtained, the shift coordinate values (x4-x3, y4-y3) with respect to the first key button (x3, y3) and the second key button (x4, y4) of the security password consecutively inputted from the user of the step (c) of the input window of the step (b) are obtained.

When the (n-1) number of the shift coordinate value of the genuine password and the (n-1) number of the shift coordinate value of the security password are obtained, and if matched by comparing each shift coordinate value, the authentication is judged to be succeeded, and if not matched, the authentication is judged as a failure.

The password authentication module 34 might be configured to receive the security password digit by digit and to perform the authentication of the security password. If the password authentication module 34 judges it as the failure of the authentication, the previous valid authentication is invalidated, and it is guided to input the security password from the first digit. If the authentication is failed for at least one digit of the security password, the previous authentication is invalidated, and the authentication is performed again, so that the present invention features in the more enhanced password authentication policy.

Figure 7:
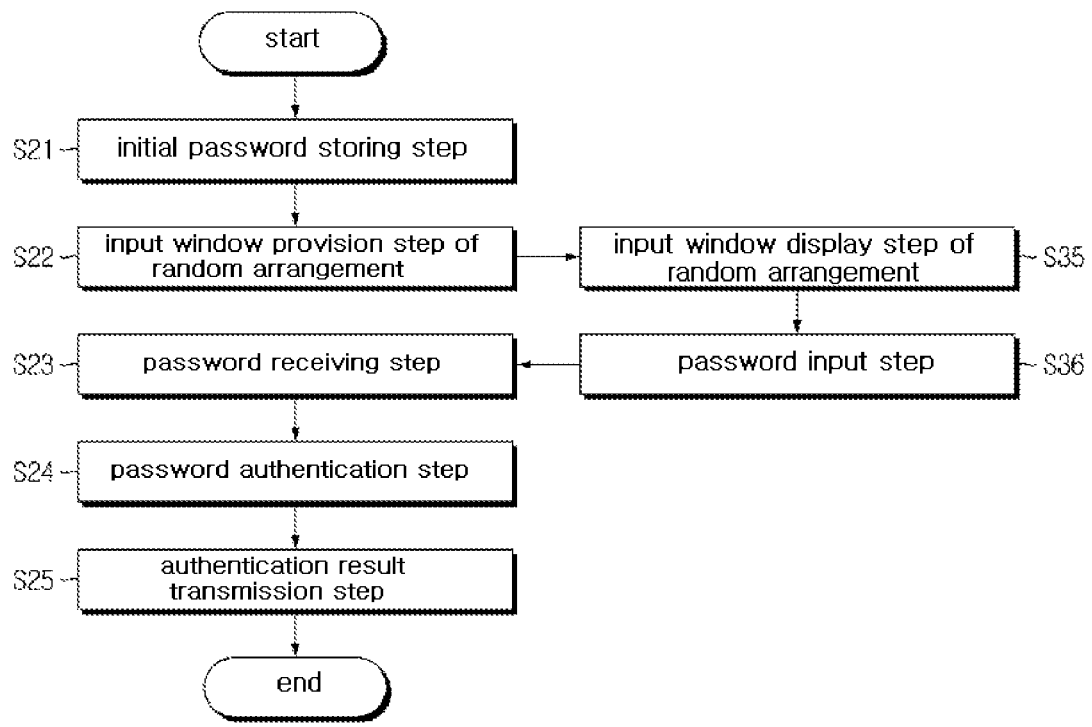
FIG. 7 is a schematic flow chart of a password security input method under a network environment according to another embodiment of the present invention.

FIG. 7 is a schematic flow chart of the password security input method of the network environment according to another embodiment of the present invention.

Referring to FIG. 6, the descriptions of the steps S31~S34 will be omitted because they are same as the steps S21~S24.

The password setting module 21 of the authentication server 2 is configured to receive the genuine password based on the initial setting of the user from the user device 3 using the wired or wireless network and stores it in the database (S21).

The input window generation module 22 is configured to generate an input window formed of the key buttons randomly arranged for each password input instance of one time and to transmit to the user terminal 3 (S22).

The user device 3 is configured to guide the input of the security password by displaying the received input window on the screen (S35) and to receive the security password to which is adapted a constant key shift value from the user, not the genuine password.

The password input module 23 receives the security password from the user device 3 (S23), and the password input module 23 receives the security password to which is adapted the key shift distance <a, b> at the key positions of the genuine password.

When a security password is received from the user device 3, the password authentication module 24 compares to determine whether the (n-1) umber of the shift values of two consecutive keys are matched at the n-digits of the password with respect to the previously stored genuine password and the security password, and if matched, the authentication is judged as the success of the authentication (S24).

The password authentication module 24 transmits a result of the authentication to the user device 3 (S25).

In the above described embodiments of the present invention, the term "module" is not used as a term for separating the hardware of the password security input system, so a plurality of modules can be integrated to one module or one module can be divided into multiple modules. The module might mean a hardware module or a software module, so it should be understood that the term "module" is not limited to its meaning.

The present invention has been described along with the embodiments with reference to the accompanying drawings, but it is not limited thereto. It is obvious that an ordinary person skilled in the art can modify or amend in various forms within the technical concepts of the present invention and the scope of the claims.

The invention claimed is:

1. A stand-alone device, comprising:
a processor; and
a memory storing instructions that, when executed, cause the stand-alone device to:
receive a genuine password from a user based on an initial setting;
generate an input window on which are randomly arranged a plurality of key buttons for each instance of an input of a password;
receive a key of a security password the position of which has changed by adapting the same shaft distance at the position of the key of the genuine password on the input window displayed on a screen; and
compare the key shift value of the previously stored genuine password on the input window and the key shift value of the security password inputted from the user and, if matched, to judge it as the password authentication is succeeded.

2. A system including an authentication server and a user terminal connected to each other via network, wherein the server comprises:
a processor; and
a memory storing instructions that, when executed, cause the stand-alone device to:
receive a genuine password from a user terminal based on an initial setting;
generate an input window on which are randomly arranged a plurality of key buttons for each instance of an input of a password and transmit to the user terminal;
receive a key of a position-changed security password by adapting the same shift distance to the key position of the genuine password of the input window from the user terminal after the input window is displayed on the user terminal; and compare the key shift value of the previously stored genuine password on the input window and the key shift value of the security password inputted from the user and, if matched, judge it as the password authentication is succeeded.

3. The stand-alone device of claim 1, wherein the input window comprises a key button containing at least one among a number key, a character key and an image key.

4. The stand-alone device of claim 1, wherein the key shift value is a shift coordinate value (x2-x1,y2-y1) with respect to a first key button (x1, y1) and a second key button (x2, y2) consecutively inputted from the password with respect to the key buttons arranged in the axes X and Y.

5. The stand-alone device of claim 4, wherein when the password is n(n>1), the (n-1) number of the key shift values obtained from two consecutively inputted keys is generated.

6. The stand-alone device of claim 1, wherein the instructions, when executed, further cause the stand-alone device to generate a n-number of the input windows on which are randomly arranged a plurality of key buttons for each digit input when the password is n(n>1), and converts to a certain input window whenever a security password of a n-digit is inputted from the user terminal.

7. The stand-alone device of claim 1, wherein the instructions, when executed, further cause the stand-alone device to receive a certain key irrespective of the shift value of the key coordinate of the genuine password.

8. The stand-alone device of claim 1, wherein the instructions, when executed, further cause the stand-alone device to perform the authentication of the security password whenever the security password key of an individual digit is inputted from the user and guides for the security password to be inputted from the beginning when the authentication of the security password is failed.

9. The system of claim 2, further comprising:

the user terminal configured to receive the input window from the authentication server and displays it on a screen, and to transmit the security password received from the user to the authentication server for requesting an authentication.

10. A password security input method using a shift value of a password key characterized in that it performs an authentication as a user terminal receives a security password, not a genuine password under a stand-alone environment, comprising:

a step (a) for receiving, at the user terminal, a genuine password from a user based on an initial setting and storing into an internal memory;

a step (b) for generating, at the user terminal, an input window on which are randomly arranged a plurality of key buttons for each instance of an input of a password;

a step (c) for receiving, at the user terminal, a key of a position-changed security password by adapting the same shift distance to the key position of the genuine password on the input window after the generated input window is displayed on the screen; and a step (d) for comparing, at the user terminal, the key shift value of the previously stored genuine password with the key shift value of the security password inputted from the user and if matched, judging that the password authentication is succeeded.

11. A password security input method using a shift value of a password key characterized in that an authentication server performs an authentication by receiving a security password, not a genuine password, under a wired or wireless environment, comprising:

a step (a) for receiving, at the authentication server, a genuine password from a user terminal based on an initial setting and storing it;

a step (b) for generating, at the authentication server, an input window on which are randomly arranged a plurality of key buttons for each instance of an input of a password and transmitting to the user terminal;

a step (c) for receiving, at the authentication server, a key of a position-changed password by adapting the same shift distance to the key position of the genuine password of the input window from the user terminal; and a step (d) for comparing, at the authentication server, the key shift value of the previously stored genuine password based on the input window with the key shift value of the security password inputted from the user and if matched judging that the password authentication is succeeded, and transmitting a result of the authentication to the user terminal.

12. The password security input method using a shift value of a password key according to claim 10, wherein the step (b) is directed to a step for generating a n-number of input windows on which are randomly arranged a plurality of key buttons for each input of an individual digit when the password is n(n>1), and whenever the security password of an individual digit is inputted from the user terminal, it is converted into an inherent input window.

13. The password security input method using a shift value of a password key according to claim 10, wherein the step (c) is directed to further receiving a certain key irrespective of the shift value of the key coordinate of the genuine password.

14. The password security input method using a shift value of a password key according to claim 10, wherein the step (d) comprises:

a step for obtaining shift coordinate values (x2-x1, y2-y1) with respect to consecutive first key button (x1, y1) and second key button (x2, y2) of the previously stored genuine password of the step (a) on the input window of the step (b);

a step for obtaining shift coordinate values (x4-x3, y4-y3) with respect to a first key button (x3, y3) and a second key button (x4, y4) of the security passwords consecutively inputted from the user of the step (c) on the input window of the step (b); and a step for comparing the shift coordinate value of the previously stored genuine password with the shift coordinate value of the security password inputted from the user and if matched judging that the authentication is succeeded.

15. The password security input method using a shift value of a password key according to claim 10, wherein the step (d) is directed to performing a password authentication whenever a security password key of an individual digit is received from the user and guides for the security password to be inputted from the beginning if the authentication of the password is failed.

* * * * *